United States Patent
Obst

(10) Patent No.: US 6,634,471 B2
(45) Date of Patent: Oct. 21, 2003

(54) HYDRAULIC TENSION STOP FOR VIBRATION DAMPERS

(75) Inventor: Steffen Obst, Ebermengen (DE)

(73) Assignee: ZF Sachs AG, Schweinfurt (DE)

(*) Notice: Subject to any disclaimer, the term of this patent is extended or adjusted under 35 U.S.C. 154(b) by 0 days.

(21) Appl. No.: 10/067,083

(22) Filed: Feb. 4, 2002

(65) Prior Publication Data
US 2002/0104723 A1 Aug. 8, 2002

(30) Foreign Application Priority Data

Feb. 5, 2001 (DE) .................................. 101 05 101

(51) Int. Cl.⁷ ................................................ F16F 9/48
(52) U.S. Cl. ....................................... 188/284; 188/300
(58) Field of Search ............................... 188/284, 286, 188/287, 288, 322.22, 300; 16/51

(56) References Cited

U.S. PATENT DOCUMENTS

| | | | | |
|---|---|---|---|---|
| 3,447,644 A | * | 6/1969 | Duckett | 188/288 |
| 4,166,612 A | * | 9/1979 | Freitag et al. | 267/64.15 |
| 4,312,499 A | | 1/1982 | Wössner et al. | 267/8 R |
| 4,328,960 A | | 5/1982 | Handke et al. | 267/8 R |
| 4,901,828 A | | 2/1990 | Schmidt et al. | 188/288 |
| 5,024,301 A | * | 6/1991 | Cook | 188/284 |
| 5,507,070 A | * | 4/1996 | Spyche, Jr. et al. | 16/49 |
| 5,509,512 A | * | 4/1996 | Grundei | 188/284 |
| 5,702,091 A | * | 12/1997 | Perrin et al. | 267/64.12 |
| 5,810,130 A | * | 9/1998 | McCandless | 188/322.22 |

FOREIGN PATENT DOCUMENTS

| | | | | |
|---|---|---|---|---|
| DE | 31 26 654 | | 1/1982 | F16F/9/49 |
| DE | 30 10 690 | | 10/1982 | F16F/9/49 |
| GB | 2 199 921 | | 7/1988 | F16F/9/49 |

* cited by examiner

Primary Examiner—Jack Lavinder
Assistant Examiner—Bradley T King
(74) Attorney, Agent, or Firm—Cohen, Pontani, Lieberman & Pavane

(57) ABSTRACT

Hydraulic tension stop for vibration dampers, shock absorbers, or similar piston-cylinder assemblies, where each assembly has a fluid-filled working space, the boundaries of which are formed axially by a piston rod guide and the piston and radially by the cylinder and the piston rod which carries the piston, part of this working space also belonging to the tension stop. A stop ring is mounted on the piston rod, which ring cooperates with a slotted, outwardly tensioned damping ring, so that the tension damping can be varied as a function of the stroke. When the stop ring reaches a predetermined position, the damping ring seats in a rest-position channel in a slide face permanently attached to the cylinder, the channel having a conical surface.

20 Claims, 4 Drawing Sheets

HYDRAULIC TENSION STOP FOR VIBRATION DAMPERS

BACKGROUND OF THE INVENTION

1. Field of the Invention

The invention pertains to a hydraulic tension stop for vibration dampers, shock absorbers, or similar piston-cylinder assemblies of the type including a cylinder, a piston rod carrying a piston, and a piston rod guide. A liquid-filled working space is bounded axially by the piston rod guide and the piston, and radially by the cylinder and the piston rod, a part of the working space being assigned to the tension stop.

2. Description of the Related Art

A hydraulic tension stop for vibration dampers of this type is known from U.S. Pat. No. 4,901,828. For this purpose, an outwardly tensioned slotted damping ring is arranged with freedom of radial movement in a ring-shaped channel of a piston-like stop body. By way of a shallow conical section, which adjoins the cylindrical contact surface in the axial direction and extends with a taper toward the piston rod guide, the damping ring cooperates with pass-through openings, which lead across the ring-shaped channel, and thus changes the cross section of the openings. The damping ring is in contact with the outer contact surface at all times, that is, during any relative motion between the piston rod and the cylinder, and thus generates a frictional resistance, which prevents the damping effect from beginning gradually. In addition, as a result of the continuous contact between the damping ring and the contact surface, there is also the danger that particles can be rubbed off, which can impair the function of the damping devices.

Tension stops for hydraulic piston-cylinder assemblies are also known in which, after a predetermined excursion, a ring-shaped piston body attached to the piston rod travels into a damping cylinder designed to serve the tension damping function, the diameter of this cylinder being smaller than that of the main cylinder. To ensure that the tension damping functions satisfactorily even under the effect of transverse forces acting on the assembly, that is, even when the piston rod is pressed and bent against one side of the piston rod guide, the components which cooperate to provide the tension damping must be produced with very high precision, that is with extremely narrow tolerances, as a result of which these components are very expensive to produce.

SUMMARY OF THE INVENTION

The task of the present invention is to create a hydraulic tension stop with an axial damping travel which can be easily predetermined, where the tension stop is active only in the stop range, and where the damping effect and damping force curve can be easily adjusted to the requirements.

According to the invention, the tension stop includes a slide face which is permanently fixed to the cylinder in the working space, and a circumferential rest position channel in the slide face. A stop ring is mounted to the piston rod in the working space so that tension damping can be changed in a stroke-dependent manner, and a slotted outwardly tensioned damping ring cooperates with the stop ring. The damping ring is slideable against the slide face and seatable in the rest-position channel when the stop ring exceeds a predetermined position.

The desired axial damping travel and the point at which the tension stop starts to function are determined by the selection of the axial position of the rest-position channel in the working space. The rest-position channel makes it possible for the damping ring to be effective only in the end region assigned to the tension damping function. By way of the axial dimension of the conical surface and/or changes to the cross section of the slot in the damping ring, the open cross section and thus the damping force curve can be adjusted to the desired values. Additional bypass channels, as normally used in vibration dampers to change the damping force in certain positions of the damping piston, can also be used to change the open cross section during the hydraulic tension damping process.

The least possible friction between the damping ring and the slide face attached to the cylinder is obtained when the conical surface extends between the slide face and the base of the rest-position groove and when the damping ring has a beveled surface conforming to the conical surface. This arrangement makes it easier for the damping ring to be carried along when the tension damping process begins, and the abrasion between the damping ring and the slide face is minimized.

In a further elaboration of the invention, the slide face and the rest-position groove for the damping ring assigned to the tension damping function are located in a sleeve connected to the cylinder. This sleeve is pressed into the cylinder, for example, so that, to adapt the tension damping to a different set of damping requirements, only the sleeve needs to be replaced. There is no deed to replace the vibration damper with one of a different size.

To exclude undesired damping cross sections for the tension damping, it is advantageous to install a sealing disk between the stop ring and the damping ring; this sealing disk is easily held in position by a stop sleeve, which acts on the end surface of the disk. The stop sleeve also serves as a driver for the damping ring as the piston rod travels into the cylinder.

For this purpose, a driver surface and at least one pass-through opening are provided on the stop sleeve, so that, when the piston rod travels into the cylinder, the outward travel from the working space assigned to the tension damping function proceeds without any damping effect. So that the damping ring can be deposited in the rest-position channel, the driver surface on the stop sleeve is designed so that the connection with the piston rod is broken when the damping ring widens elastically.

A very wide range of freedom with respect to the choice of the open cross section is created according to the invention when the sleeve itself has a stroke-dependent open cross section. This stroke-dependent open cross section is created, for example, by means of at least one cutout in the sleeve, which tapers down in the lengthwise direction. The open cross section can also be created by several radial bores, which are arranged in a row in the axial direction in the sleeve and which open out into a pass-through channel, which is located between the inside wall of the cylinder and the sleeve and which preferably consists of a longitudinal groove in the sleeve on the side facing the cylinder.

If it is necessary to damp the operating noise of the hydraulic tension stop, a damping disk can be installed between the stop ring and the sealing disk. To improve the pressure relationships in the partial working space assigned to the hydraulic tension stop, the amount of oil present in the partial working space can be easily increased by expanding the cylinder in the area of the tension stop and by inserting an appropriately designed sleeve into this expanded area. This measure can also help to reduce the operating noise.

It is easy to combine the hydraulic tension stop with a mechanical tension stop known in and of itself. This can be done, for example, by installing the mechanical tension stop between the piston rod guide and the stop sleeve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Because the design and function of standard commercial piston-cylinder assemblies are sufficiently well known to the expert in the field, only the components of these assemblies in the area of the tension stop are shown. It is assumed that the vibration damper is serving as an assembly for a motor vehicle, which assembly is provided with a hydraulic tension stop according to the invention as illustrated by the embodiments shown in the figures. Accordingly, the following description pertains essentially to the design and function of the embodiments of hydraulic tension stops according to the invention.

Figure 1:
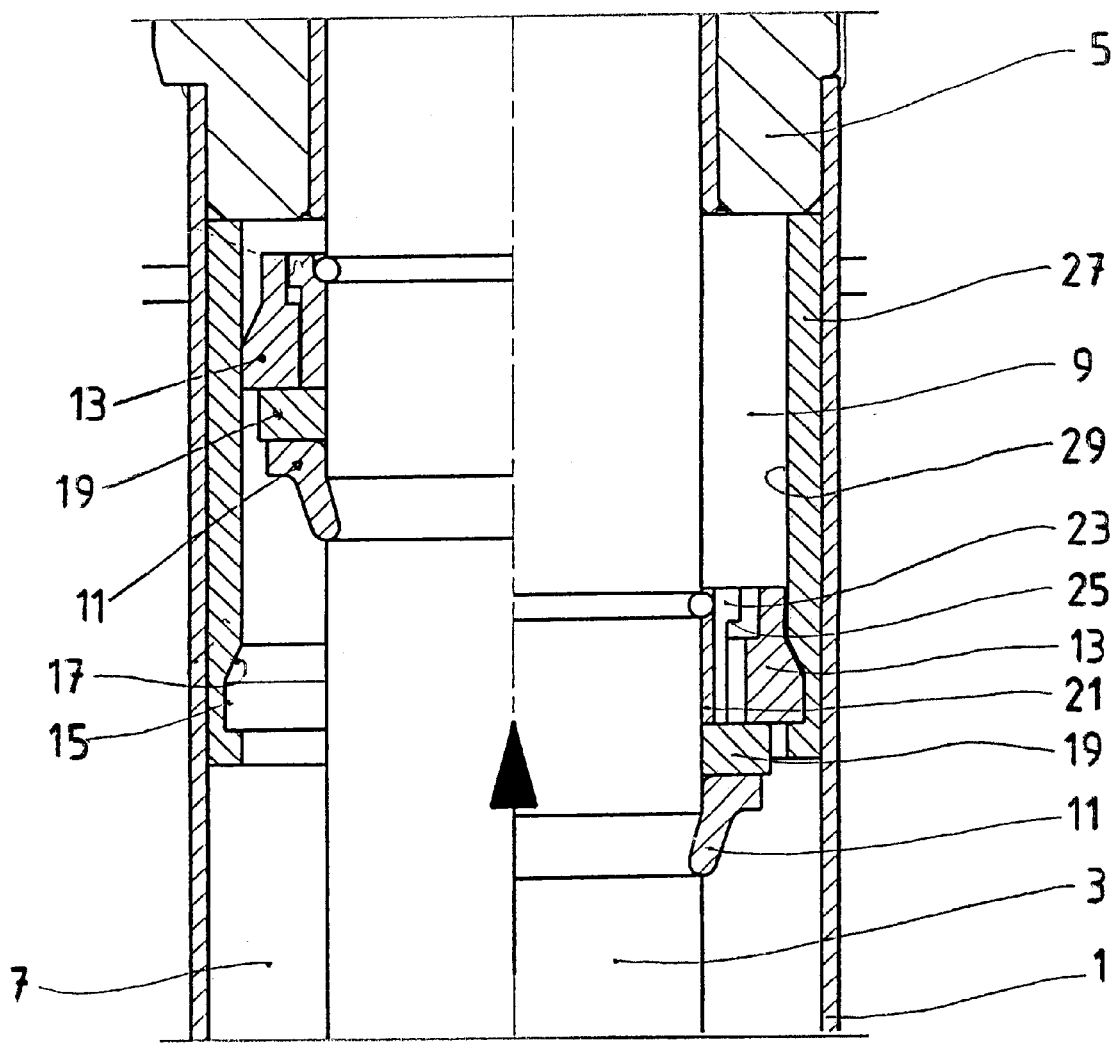
FIG. 1 is a longitudinal section through a hydraulic tension stop for a vibration damper or shock absorber while the tension stop is in operation.

The portion of a vibration damper shown in FIG. 1 includes a cylinder 1, in which a piston rod 3, which is free to move in the axial direction and which is sealed off toward the outside, travels back and forth through a piston rod guide 5. A damping piston (not shown), connected to the piston rod 3, is provided with damping devices and operates in the damping fluid-filled working space 7. This working space 7 has a partial working space 9, which is assigned to a hydraulic tension stop. This hydraulic tension stop has a stop ring 11 installed in a channel in the piston rod 3; a sealing disk 19 rests against the end surface of this stop ring. The sealing disk itself is acted upon by a stop sleeve 21, which is attached to the piston rod 3 by means of a groove and a wire ring laid in the groove. The stop sleeve 21 has at least one pass-through opening 23 extending over its entire axial length and a driver surface 25 for a damping ring 13, which is slotted and which can be deposited in a rest-position channel 15, where it exerts a tensioning effect in the radially outward direction. This rest-position channel 15 is located in a sleeve 27 attached to the cylinder 1, which sleeve has a slide face 29 and a conical surface 17, extending between the base of the rest-position groove and the slide face 29.

The way in which the hydraulic tension stop illustrated in FIG. 1 works is described below on the basis of the direction of motion of the piston rod indicated by the arrow drawn in the figure. The hydraulic tension stop operates in the end area of the outward movement of the piston rod 3 in the cylinder. The right half of FIG. 1 corresponds to the phase in which the hydraulic tension stop is beginning to go into action. Here, the sealing disk 19, supported on the stop ring 11, comes into contact with the end surface of the damping ring 13, located in the rest-position channel 15. The partial working space 9 is separated from the working space 7 at this stage. As the piston rod 3 continues to travel outward, the sealing disk 19 presses with a sealing action against the end surface of the damping ring 13 and carries it along. Thus the surface of the damping ring 13 which conforms to the conical surface 17 slides along this conical surface, and thus the entire ring moves out of the rest-position channel 15 and escapes in the radially inward direction until it starts to cooperate with the slide face 29. The cross section formed by the slot in the damping ring 13 and/or an opening present in the sleeve 27 can be provided as an open cross section which varies as a function of the stroke. Cross sections of this type, which can vary as a function of the distance traveled, are used in vibration dampers as bypasses around the piston when it is damping in an intermediate position and are usually designed as longitudinal channels in the cylinder. Accordingly, the stroke-dependent open cross section can consist of several longitudinal channels of different lengths in the sleeve 27, so that the damping effect increases with the outward travel of the piston rod 3 and a type of hydraulic blocking occurs at the end of the hydraulic tension stop. The end or nearly the end of the action of the hydraulic tension stop is shown on the left side of FIG. 1, where it is clear that the damping ring 13 has a small amount of axial play with respect to the driver surface 25 of the stop sleeve 21, and accordingly, after it has escaped from the rest-position channel+15, it is guided in the receptacle formed by the stop sleeve 21 and the sealing disk 19 with axial and possibly also with radial play.

Figure 2:
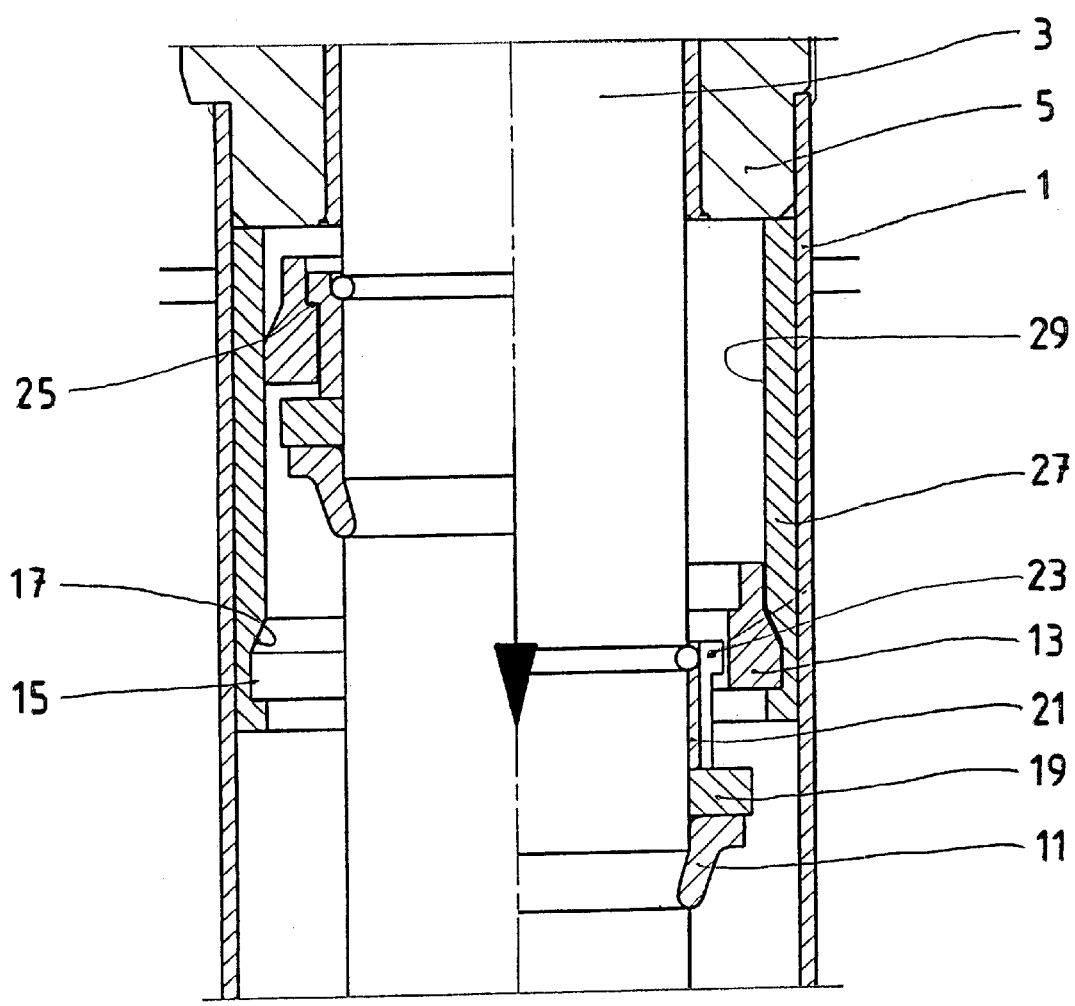
FIG. 2 shows the tension stop of FIG. 1, while the piston rod is traveling into the cylinder.

FIG. 2 shows the hydraulic tension stop according to FIG. 1 as the piston rod 3 is moving into the cylinder 1. The arrow illustrates the reversal of the motion of the piston rod 3, which occurs upon completion of the stop action, as shown in the illustration on the left side of the figure. Here the damping ring 13 comes into contact with the driver surface 25, and as a result of the freedom of axial movement of the damping ring 13 on the stop sleeve 21, the pass-through opening 23 is released. Thus the damping ring 13 is able to perform its return movement on the slide face 29 of the sleeve 27 without any hydraulic damping.

The right side of FIG. 2 shows the end of this return movement of the damping ring 3. In this phase, the intrinsic tension of the damping ring 13 allows it to slide down the conical surface 17 and lodge in the rest-position channel 15. As a result of the increase in the inside diameter of the damping ring, the ring is released by the driver surface 25 of the stop sleeve 21. The piston rod 3 then continues to travel inward without carrying the damping ring 13 along with it. Thus, in the normal working range of the vibration damper, the damping ring 13 is in the rest position and without effect.

Figure 3:
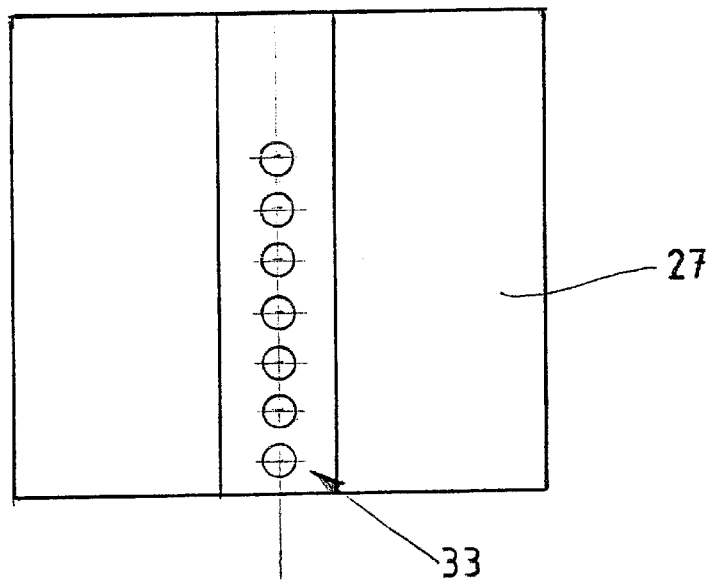
FIG. 3 shows a sleeve for the tension stop, which sleeve has an open cross section with radial bores.

FIG. 3 shows a sleeve 27 with an open cross section 33. This open cross section 33 consists of several radial bores arranged in a row in the axial direction, which open out into a longitudinal channel in the outside surface of the sleeve 27. In this way, an open cross section 33 between the partial working space and the working space is created, the size of which depends on the position of the damping ring.

Figure 4:
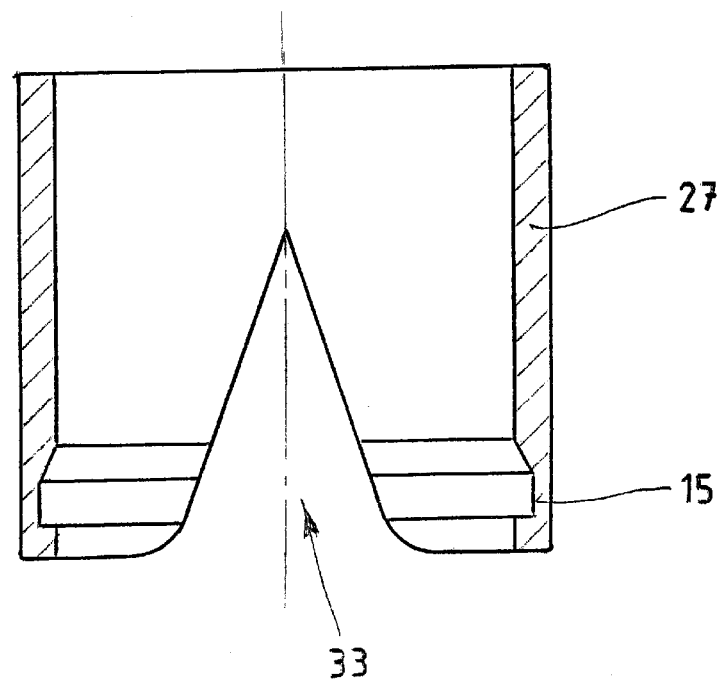
FIG. 4 shows a sleeve for the tension stop, in which sleeve a cutout is provided, which tapers down in the axial direction to form the open cross section.

FIG. 4 shows another open cross section 33 in the sleeve 27, which also varies as a function of the stroke. This open cross section 33 is formed by a cutout in the sleeve 27, which has the greatest width in the area of the rest-position channel 15, the width then decreasing in the axial direction. The end of the cutout can be located so that a more-or-less hydraulic blocking of the outward-bound travel of the piston rod occurs as a result of the hydraulic tension stop when the damping ring reaches this position.

Figure 5:
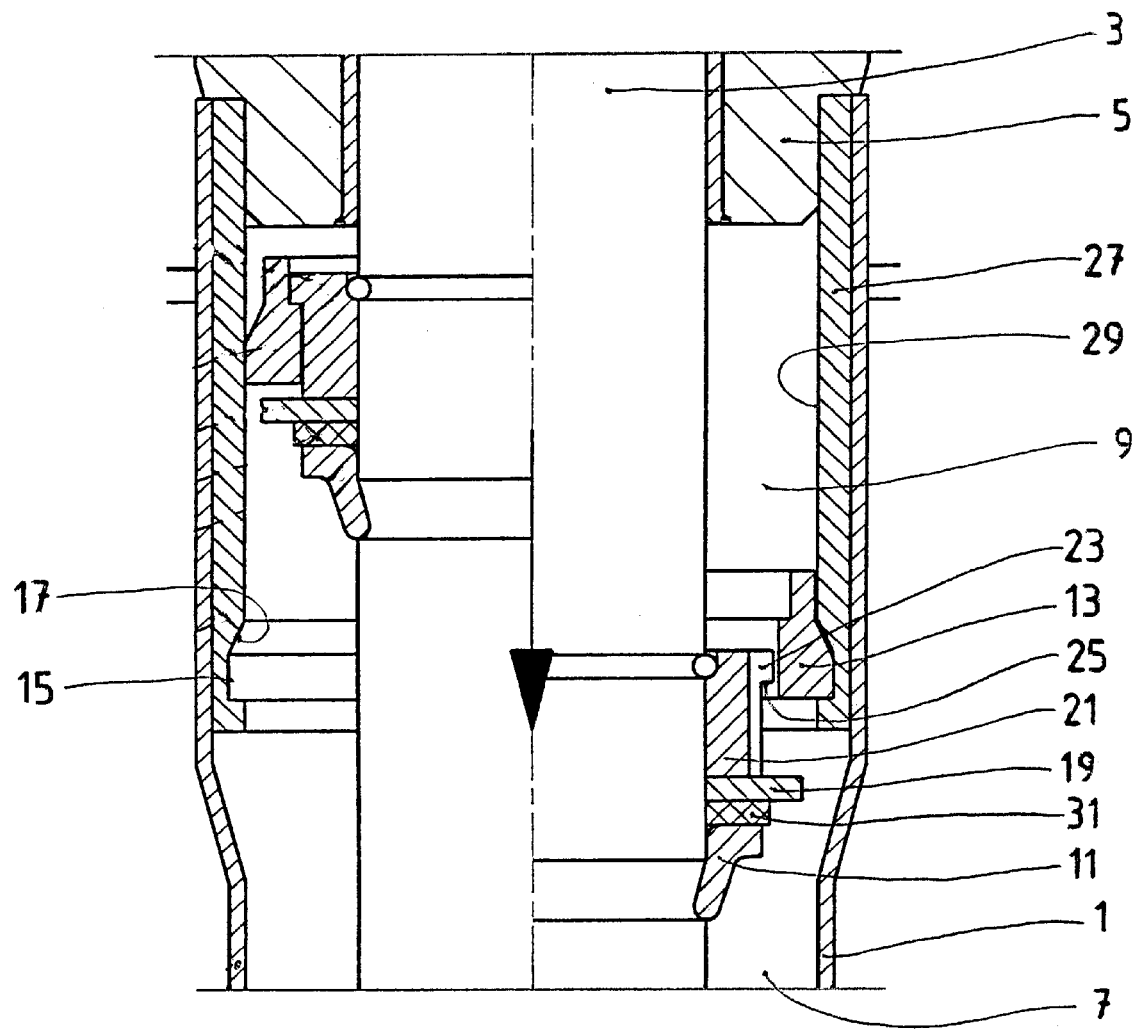
FIG. 5 shows an embodiment of the hydraulic tension stop in longitudinal cross section with a sleeve installed in the expanded end of the cylinder.

The embodiment of the hydraulic tension stop shown in FIG. 5 differs from that according to FIGS. 1 and 2 in that the cylinder 1 has been expanded in the area of the tension stop and holds an appropriately designed sleeve 27. It is advantageous for the inside diameter of the sleeve 27 to correspond to the inside diameter of the cylindrical contact surface of the cylinder 1, as a result of which the mass-produced piston rod guide 5 can be used without modification. As a result of the increase in the size of the partial working space 9 thus obtained and the correspondingly larger amount of oil, the pressure relationships are improved for the hydraulic tension stop. By means of a damping disk 31, which is located between the stop ring 11 and the sealing disk 19, the operating noise of the hydraulic tension stop is damped. For the rest, the design and function of this tension stop are the same as those of the embodiment according to FIGS. 1 and 2, as are the reference numbers.

The essential idea of the invention consists in the cooperation of the damping ring 13 with the rest-position channel 15 and the receptacle, which forms a fixed part of the piston rod 3, which receptacle can consist, for example, only of the stop ring 11 and the stop sleeve 21, but which can also be provided advantageously with a sealing disk 19 and possibly also with a damping ring disk 31. A combination of this hydraulic tension stop with a mechanical tension stop can also be easily realized. For example, the mechanical tension stop can be formed by an elastic buffer, which acts between the piston rod guide 5 and the stop sleeve 21.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A hydraulic tension stop for a vibration damper of the type comprising a cylinder, a piston rod carrying a piston, a piston rod guide, and a liquid-filled working space which is bounded axially by the piston rod guide and the piston, and radially by the cylinder and the piston rod, said tension stop comprising a slide face which is permanently fixable to the cylinder in said working space, a circumferential rest-position channel in said slide face, said channel having a conical surface, a sleeve which is permanently fixable to the cylinder in said working space, said slide face and said channel being located in said sleeve, said sleeve having an open cross-section which varies as a function of position of the piston rod, said open cross-section being formed by a pass-through channel facing said cylinder, and a plurality of bores extending axially along said sleeve and opening in said pass-through channel, a stop ring mountable to the piston rod in the working space so that tension damping can be changed in a stroke dependent manner, and a slotted, outwardly tensioned damping ring which cooperates with said stop ring, said damping ring being slideable against said slide face and seatable in said rest-position channel when said stop ring exceeds a predetermined position.

2. A hydraulic tension stop as in claim 1 wherein said rest-position channel comprises a base, said conical surface extending between said slide face and said base, said damping ring having a beveled surface which conforms to said conical surface when said damping ring seats in said rest-position channel.

3. A hydraulic tension stop as in claim 1 further comprising a sealing disk located between the stop ring and the damping ring.

4. A hydraulic tension stop as in claim 3 further comprising a stop sleeve which is attachable to the piston rod, said stop sleeve bearing against the sealing disk, said stop sleeve having at least one pass-through opening and a driver surface which bears against said damping ring to slide said damping ring against said slide surface, and releases said damping ring when said damping ring seats in said rest-position channel.

5. A hydraulic tension stop as in claim 1 wherein said cross-section is formed by a cutout having a width which varies axially.

6. A hydraulic tension stop as in claim 1 further comprising a sealing disk located between the stop ring and the damping ring, and a damping ring disk located between the stop ring and the sealing disk.

7. A vibration damper comprising a cylinder, a piston rod carrying a piston which is moveable axially in said cylinder, a piston rod guide fixed in said cylinder, a liquid-filled working space which is bounded axially by the piston rod guide and the piston, and radially by the cylinder and the piston rod, a sleeve which is permanently fixed to the cylinder in said working space, said sleeve comprising a slide face and a circumferential rest-position channel in said slide face, said channel having a conical surface, a stop ring mounted to the piston rod in the working space so that tension damping can be changed in a stroke dependent manner, a slotted, outwardly tensioning damping ring which cooperates with said stop ring, said damping ring being slideable against said slide face and seatable in said rest-position channel when said stop ring exceeds a predetermined axial position, and a stop sleeve which is attachable to the piston rod, said stop sleeve having at least one pass-through opening and a driver surface which bears against said damping ring to slide said damping ring against said slide face, and releases said damping ring when said damping ring seats in said rest-position channel.

8. A vibration damper as in claim 7 wherein said rest-position channel comprises a base, said conical surface extending between said slide face and said base, said damping ring having a beveled surface which conforms to said conical surface when said damping ring seats in said rest-position channel.

9. A vibration damper as in claim 7 further comprising a sealing disk located between the stop ring and the damping ring.

10. A vibration damper as in claim 7 wherein said sleeve has an open cross-section which varies as a function of position of the piston rod.

11. A hydraulic tension stop for a vibration damper of the type comprising a cylinder, a piston rod carrying a piston, a piston rod guide, and a liquid-filled working space which is bounded axially by the piston rod guide and the piston, and radially by the cylinder and the piston rod, said tension stop comprising a slide face which is permanently fixable to the cylinder in said working space, a circumferential rest-position channel in said slide face, said channel having a conical surface, a stop ring mountable to the piston rod in the working space so that tension damping can be changed in a stroke dependent manner, a slotted, outwardly tensioned damping ring which cooperates with said stop ring, said damping ring being slideable against said slide face and seatable in said rest-position channel when said stop ring exceeds a predetermined position, a sealing disk located between the stop ring and the damping ring, and a stop sleeve which is attachable to the piston rod, said stop sleeve bearing against the sealing disk, said stop sleeve having at least one pass-through opening and a driver surface which bears against said damping ring to slide said damping ring against said slide surface, and releases said damping ring when said damping ring seats in said rest-position channel.

12. A hydraulic tension stop as in claim 11 wherein said rest-position channel comprises a base, said conical surface extending between said slide face and said base, said damping ring having a beveled surface which conforms to said conical surface when said damping ring seats in said rest-position channel.

13. A hydraulic tension stop as in claim 11 further comprising a damping ring disk located between the stop ring and the sealing disk.

14. A hydraulic tension stop for a vibration damper of the type comprising a cylinder, a piston rod carrying a piston, a piston rod guide, and a liquid-filled working space which is bounded axially by the piston rod guide and the piston, and radially by the cylinder and the piston rod, said tension stop comprising a slide face which is permanently fixable to the cylinder in said working space, a circumferential rest-position channel in said slide face, said channel having a conical surface, a stop ring mountable to the piston rod in the working space so that tension damping can be changed in a stroke dependent manner, a slotted, outwardly tensioned damping ring which cooperates with said stop ring, said damping ring being slideable against said slide face and seatable in said rest-position channel when said stop ring exceeds a predetermined position, a sealing disk located between the stop ring and the damping ring, and a damping ring disk located between the stop ring and the sealing disk.

15. A hydraulic tension stop as in claim 14 wherein said rest-position channel comprises a base, said conical surface extending between said slide face and said base, said damping ring having a beveled surface which conforms to said conical surface when said damping ring seats in said rest-position channel.

16. A hydraulic tension stop as in claim 14 further comprising a sleeve which is permanently fixable to the cylinder in said working space, said slide face and said channel being located in said sleeve.

17. A hydraulic tension stop as in claim 14 further comprising a stop sleeve which is attachable to the piston rod, said stop sleeve bearing against the sealing disk, said stop sleeve having at least one pass-through opening and a driver surface which bears against said damping ring to slide said damping ring against said slide surface, and releases said damping ring when said damping ring seats in said rest-position channel.

18. A hydraulic tension stop as in claim 16 wherein said sleeve has an open cross-section which varies as a function of position of the piston rod.

19. A hydraulic tension stop as in claim 18 wherein said open cross-section is formed by a cutout having a width which varies axially.

20. A hydraulic tension stop as in claim 18 wherein said open cross-section is formed by a pass-through channel facing said cylinder, and a plurality of bores extending axially along said sleeve and opening in said pass-through channel.

* * * * *